US006812590B2

(12) United States Patent
Lee et al.

(10) Patent No.: US 6,812,590 B2
(45) Date of Patent: Nov. 2, 2004

(54) POWER SUPPLY CIRCUIT

(75) Inventors: Yonghwan Lee, Ibaraki-ken (JP); Manabu Nishimizu, Oita-ken (JP); Yoshinori Okada, Oita-ken (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/259,687

(22) Filed: Sep. 27, 2002

(65) Prior Publication Data

US 2003/0122529 A1 Jul. 3, 2003

(30) Foreign Application Priority Data

Oct. 4, 2001 (JP) ....................................... 2001-308452

(51) Int. Cl.[7] .................................................. H02J 1/00

(52) U.S. Cl. ............................. 307/33; 307/37; 307/69; 323/318; 327/530

(58) Field of Search ................................ 323/313, 314, 323/316, 312, 318, 352; 307/4, 8, 11, 19, 37, 41, 61, 69, 87, 150, 131, 108, 64, 10.1, 99, 46, 66; 327/108, 53, 530, 534, 537, 540

(56) References Cited

U.S. PATENT DOCUMENTS 6,005,434 A * 12/1999 Tsukikawa et al. ......... 327/537

* cited by examiner

*Primary Examiner*—Rajnikant B Patel
(74) *Attorney, Agent, or Firm*—W. Daniel Swayze, Jr.; W. James Brady; Frederick J. Telecky, Jr.

(57) ABSTRACT

External output terminal 28 is clamped by clamping circuit 20, and a current mirror is configured using diode circuit 23 within clamping circuit 20 and detector transistor 34. When the voltage of external output terminal 28 can no longer be maintained by the first current supply circuit 11 alone as load 27 increases, clamping circuit 20 shuts off, and detector transistor 34 shuts off. As detector transistor 34 shuts off, the second current supplying element 12 becomes conductive and supplies a current to load 27. Because the second current supplying element 12 is not operating during normal operation during which the current consumption by load 27 is low, the current consumption is low. In addition, because no amplifier is required, only a small number of elements are required.

3 Claims, 2 Drawing Sheets

POWER SUPPLY CIRCUIT

FIELD OF THE INVENTION

The present invention pertains to the field of power supply circuit technology; in particular, to a power supply circuit suitable as an internal power supply of a liquid crystal driver IC.

BACKGROUND OF THE INVENTION

A power supply circuit as a conventional liquid crystal driver IC circuit is indicated by symbol 102 in FIG. 3.

Symbol $V_{DD}$ in FIG. 3 and FIGS. 1 and 2 to be described later indicates a positive voltage line connected to a positive voltage source of 3V or so, and symbol $V_{EE}$ indicates a negative voltage line connected to a negative voltage source of −15V or so. In addition, symbol $V_{SS}$ is the ground potential.

The power supply circuit 102 has output transistor 111, amplifier 112, voltage detection circuit 120, and reference voltage circuit 125.

The output transistor 111 is configured with a p-channel MOS transistor, its source terminal is connected to positive voltage line $V_{DD}$, and its drain terminal is connected to external output terminal 128. Its gate terminal is connected to the output terminal of amplifier 112.

Load 127 and voltage detection circuit 120 are connected to external output terminal 128, whereby when output transistor 111 becomes conductive as amplifier 112 outputs a low signal, a current is supplied to load 127. At this time, the voltage of external output terminal 128 is divided by resistor elements 121 and 122 in detection circuit 120 and input as detection voltage $V_S$ to the inverted input terminal of amplifier 112.

Reference voltage circuit 125 is connected to the non-inverted input terminal of amplifier 112 in order to input reference voltage $V_{ref}$ output from reference voltage circuit 125.

When detection voltage $V_S$ is higher than reference voltage $V_{ref}$, the output voltage of amplifier 112 increases, the current driver capability of output transistor 111 drops, and the current flow therein drops, so that the voltage of external output terminal 128 drops.

On the contrary, when detection voltage $V_S$ is lower than reference voltage $V_{ref}$, the output voltage of amplifier 112 decreases, the current driver capability of output transistor 111 increases, and the current flow therein increases, so that the voltage of external output terminal 128 increases.

The voltage of external output terminal 128 is regulated to a fixed voltage by the negative feedback operation of amplifier 112 in said manner.

In terms of the configuration of reference voltage circuit 125, reference voltage circuit 125 has bias circuit 140 and voltage generator circuit 130.

The bias circuit 140 is configured by connecting diode-connected p-channel type MOS transistor 141 in series with resistor element 142, and the differential voltage between positive voltage line $V_{DD}$ and ground voltage $V_{SS}$ is applied to bias circuit 140. Here, a voltage obtained by subtracting the operating voltage of MOS transistor 141 from the differential voltage is applied to resistor element 142.

Because the voltage of positive voltage line $V_{DD}$ is almost fixed, a constant voltage is applied to resistor element 142, and a constant current of a fixed amount flows therein. Said constant current also flows into MOS transistor 141.

Reference voltage generator circuit 130 has p-channel type MOS transistor 131 and n-channel type MOS transistor 134.

P-channel type MOS transistor 131 includes a current mirror circuit together with diode-connected MOS transistor 141 in bias circuit 140, and a current proportional to the current flowing in diode-connected MOS transistor 141 flows into said MOS transistor 131.

In addition, n-channel type MOS transistor 134 is diode-connected, and a current flows therein from MOS transistor 131 constituting the current mirror circuit. As a result, a constant voltage close to the threshold voltage is generated at both ends of diode-connected n-channel type MOS transistor 134.

The constant voltage serves as reference voltage $V_{ref}$ and is input to the inverted input terminal of amplifier 112.

In the case of power supply circuit 102, its current supplying capability needs to be determined according to the maximum current consumption by load 127. Because said load 127 is an internal logic circuit provided in a liquid crystal driver IC, and the size of output transistor 111 needs to be increased, the power consumption of power supply circuit 102 is difficult to decrease.

In addition, because amplifier 112 requires an internal capacitor for phase compensation, a large area is needed, resulting in high cost.

The present invention was created to solve the problems of the prior art, and its objective is to present a low power consumption, reduced size power supply circuit.

SUMMARY OF INVENTION

In order to solve the problems, the power supply circuit of the present invention is provided with a current supply circuit having a first current supplying element connected in parallel to a current supply terminal and a second current supplying element configured with a transistor, a detection circuit containing a clamping circuit provided with multiple diode circuits and connected in series with the current supply circuit in order to output a detection signal according to the voltage at the current supply terminal, and a control circuit having the second current supplying element, a first transistor including a current mirror, a second transistor which becomes conductive or non-conductive according to the detection signal, and a third transistor connected in series with the first transistor in order to control the conduction status of the first transistor according to the conduction status of the second transistor.

Also, in the power supply circuit of the present invention, it is desirable that a bias circuit which outputs a bias voltage be provided, and that the bias voltage be applied to the control terminal of the transistor of first current supplying element.

Moreover, it is desirable that the bias circuit have a fourth transistor which includes a current mirror together with the first current supply circuit, and that the control circuit have a fifth transistor which constitutes a current mirror circuit together with the fourth transistor while supplying supply current to the second transistor.

The power supply circuit of the present invention is included in the diode circuits that are by diode-connecting MOS transistors, and the diode circuits are connected in series to form the clamping circuit; and the diode-connected MOS transistors form a current mirror together with the second transistor (detector transistor).

The detector transistor enters either a conductive or a shut-off status according the status, that is, either conductive or shut-off, of the clamping circuit, whereby the conduction status of the first transistor (driver transistor) is controlled in order to control the operation of the second current driver element.

In addition, the clamping circuit has a function to maintain the voltage value at the current supply terminal at an almost fixed voltage.

DESCRIPTION OF THE EMBODIMENTS

Figure 1:
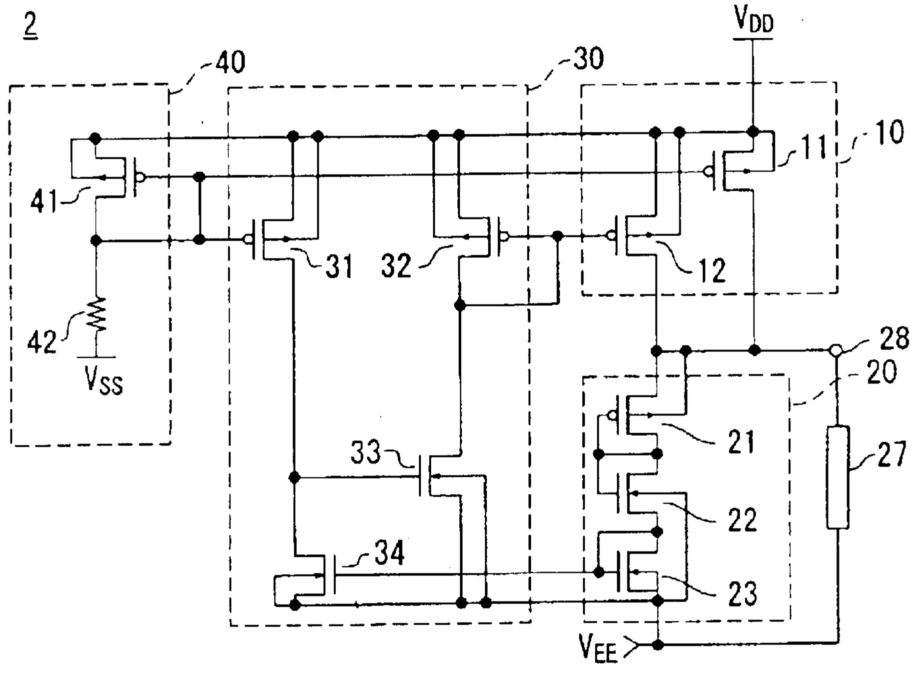
FIG. 1 shows a power supply circuit of the present invention.

In reference to FIG. 1, symbol 2 indicates the power supply circuit.

The power supply circuit 2 has output circuit 10, clamping circuit 20, current source control circuit 30, and bias circuit 40.

Bias circuit 40 has bias transistor 41 configured with a p-channel type MOS transistor and bias resistor 42 configured with a resistor element. The source terminal of bias transistor 41 is connected to positive voltage line $V_{DD}$, and its drain terminal is connected to one end of bias resistor 42. The other end of bias resistor 42 is connected to ground voltage $V_{SS}$.

The gate terminal of bias transistor 41 is short-circuited with the drain terminal. As a result, when a prescribed voltage is applied to positive voltage line $V_{DD}$ and ground voltage $V_{SS}$, bias circuit 40 becomes conductive the first, and a current flows into bias transistor 41.

Output circuit 10 has the first and the second current supplying elements 11 and 12 configured with p-channel type MOS transistors.

The source terminal of first current supplying element 11 is connected to positive voltage line $V_{DD}$, and its drain terminal is connected to external output terminal 28. Its gate terminal is connected to the gate terminal and the drain terminal of bias transistor 41. Therefore, bias transistor 41 and first current supplying element 11 constitute a current mirror circuit, and a current in proportion to the current flowing in bias transistor 41 flows into first current supplying element 11 and is supplied to external output terminal 28.

Load 27 is connected between external output terminal 28 and negative voltage line $V_{EE}$. Clamping circuit 20 is connected in parallel to load 27, and a current supplied from first current supplying element 11 is supplied to load 27 and clamping circuit 20. Clamping circuit 20 has first through third diode circuits 21 through 23.

First diode circuit 21 is configured with a p-channel MOS transistor in which the gate terminal and the drain terminal are short-circuited, and the second and the third diode circuits 22 and 23 are configured with n-channel MOS transistors in which the gate terminal and the drain terminal are short-circuited.

The diode circuits 21 through 23 are connected in series in the respective order, anode terminal (source terminal) of the first diode circuit 21 is connected to external output terminal 28, and cathode terminal (source terminal) of the third diode circuit 23 is connected to negative voltage line $V_{EE}$.

Therefore, when the differential voltage between external output terminal 28 and negative voltage line $V_{EE}$ becomes higher than the voltage which makes the MOS transistors constituting the diode circuits 21 through 23 conductive, clamping circuit 20 becomes conductive.

While in the conductive state, the voltage generated at both ends of the diode circuits 21 through 23 is almost the same as the threshold voltages of the MOS transistors, and a voltage with the added threshold voltages of the first through the third diode circuits is generated at both ends of clamping circuit 20.

Also, while in the conductive state, because the internal resistances of the diode circuits 21 through 23 are low, the voltage at both ends is almost fixed even when the current increases or decreases. Here, the voltage generated at both ends when clamping circuit 20 is conductive is expressed using clamping voltage $V_C$.

Therefore, clamping voltage $V_C$ is maintained as the voltage of external output terminal 28 even when the current flowing in clamping circuit 20 increases since the current flowing in load 27 increases as long as clamping circuit 20 remains conductive. In other words, the configuration is such that the voltage of external output terminal 28 is clamped by clamping voltage $V_C$ and does not increase beyond said clamping voltage $V_C$.

Current source control circuit 30 has detector transistor 34 configured with an n-channel type MOS transistor and load transistor 31 configured with a p-channel type MOS transistor.

Like the first current supplying element 11, gate terminal of load transistor 31 is connected to the gate terminal and the drain terminal of bias transistor 41, and its source terminal is connected to positive voltage line $V_{DD}$; and a current in proportion to the current flowing in bias transistor 41 flows therein.

The drain terminal of detector transistor 34 is connected to the drain terminal of load transistor 31, and its source terminal is connected to negative voltage line $V_{EE}$; and the current flows in load transistor 31 is supplied to detector transistor 34.

The gate terminal of detector transistor 34 is connected to the drain terminal and the gate terminal (anode terminal) of the third diode circuit 23 connected directly to negative voltage line $V_{EE}$ in clamping circuit 20.

Therefore, detector transistor 34 constitutes a current mirror together with the third diode circuit 23 in clamping circuit 20. As a result, detector transistor 34 becomes conductive as a current flows in clamping circuit 20 and supplies a current proportional to the current flowing in the third diode circuit 23 to the load transistor.

Here, when clamping circuit 20 is conductive, and detector transistor 34 is conductive, the drain terminal of detector transistor 34 has almost the same voltage as that at the source terminal, that is, the voltage of negative voltage line $V_{EE}$.

When detector transistor 34 is shut off, because load transistor 31 supplies a current to the drain terminal of detector transistor 34 instead of shutting off immediately, the voltage at said drain terminal increases to almost the same level as that of positive voltage line $V_{DD}$.

Current source control circuit 30 has inversion transistor 33 configured with an n-channel transistor and driver transistor 32 configured with a p-channel transistor, wherein the source terminal of inversion transistor 33 is connected to negative voltage line $V_{EE}$, and its gate terminal is connected to the drain terminal of detector transistor 34.

Therefore, inversion transistor 33 shuts off when detector transistor 34 is conductive and becomes conductive when it is shut off.

The source terminal of driver transistor 32 is connected to positive voltage line $V_{DD}$, and its drain terminal and the gate terminal are short-circuited and connected to the drain terminal of inversion transistor 33. Therefore, a current flows into said driver transistor 32 when inversion transistor 33 becomes conductive, and driver transistor 32 shuts off when inversion transistor 33 shuts off.

The source terminal of second current supplying element 12 is connected to source voltage line $V_{DD}$, and its drain terminal is connected to external output terminal 28. Therefore, second current supplying element 12 is connected in parallel to the first current supplying element 11.

The gate terminal of said second current supplying element 12 is connected to the gate terminal and the drain terminal of driver transistor 32, and the second current supplying element 12 constitutes a mirror circuit together with driver transistor 32. As a result, second current supplying element 12 becomes conductive as driver transistor 32 becomes conductive and shuts off when it shuts off.

At the beginning of operation of power supply circuit 2, detector transistor 34 remains off after bias circuit 40 becomes conductive until clamping circuit 20 becomes conductive. Inversion transistor 33 becomes conductive as detector transistor 34 shuts off, and a current flows into driver transistor 32. As a result, the second current supplying element 12 operates in parallel with the first current supplying element 11 and supplies a current to load 27 and clamping circuit 20.

As clamping circuit 20 becomes conductive, a current flows in, the diode circuits 21 through 23, and detector transistor 34 becomes conductive, inversion transistor 33 shuts off, and no current flows into driver transistor 32, so that the second current supplying element 12 shuts off.

Under the above condition, a current is supplied from the first current supplying element 11 to load 27 and clamping circuit 20.

Once the current flows into clamping circuit 20, clamping voltage $V_C$ is generated at both ends of clamping circuit 20.

As the current flowing in load 27 increases, and the voltage of external output terminal 28 drops below clamping voltage $V_C$, the diode circuits 21 through 23 cannot maintain conductance any longer, so that clamping circuit 20 shuts off.

Because detector transistor 34 also shuts off under the above condition, inversion transistor 33 becomes conductive and lets a current flow into driver transistor 32. As a result, the second current supplying element 12 becomes conductive, operates in parallel with the first current supplying element 11, and increases the voltage at external output terminal 28.

Once the current flows into clamping circuit 20 as the voltage of external output terminal 28 increases, detector transistor 34 becomes conductive, inversion transistor 33 shuts off, and driver transistor 32 shuts off, so that the second current supplying element 12 also shuts off.

That is, clamping circuit 20, detector transistor 34, inversion transistor 33, and driver transistor 32 constitute a negative feedback loop for feeding the voltage of the output terminal negatively back to the input terminal while using the drain terminal of the second current supplying element 12 as an output terminal and the gate terminal as an input terminal, whereby the voltage of external output terminal 28 changes according to the change in the current consumed by load 27, and second current supplying element 12 operates according to the change in voltage in order to regulate the voltage of external output terminal 28 at a fixed voltage.

Once clamping circuit 20 becomes fully conductive as the current flowing in load 27 decreases, the second current supplying element 12 shuts off, and normal operation is resumed.

As described above, in the case of power supply circuit 2 of the present invention, when the current flowing in load 27 is low, the second current supplying element 12 does not operate, and only the first current supplying element 11 operates.

The power consumption of the power supply circuit under normal operation, during which only the first current supplying element 11 operates, can be reduced by regulating the current supplied by the first current supplying element 11 appropriately with respect to the current consumed by load 27.

On the other hand, because the second current supplying element 12 operates when a large current flows into load 27, the current supplied to external output terminal 28 increases, and the voltage of external output terminal 28 increases.

As described above, because the second current supplying element 12 operates only when a large current flows into load 27, the overall power consumption is reduced. Although an example in which the first current supplying element 11 was configured using a p-channel MOS transistor was explained above, the present invention is not limited to this.

Figure 2:
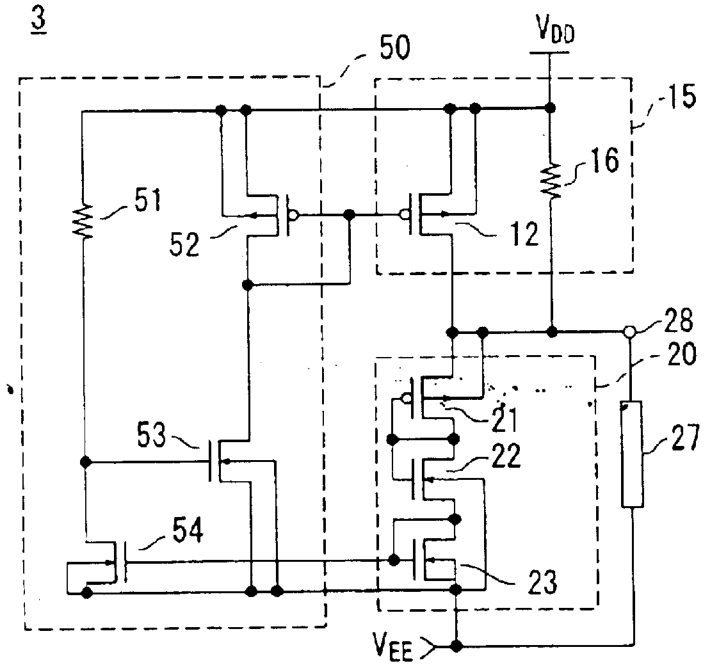
FIG. 2 shows another power supply circuit of the present invention.
Figure 3:
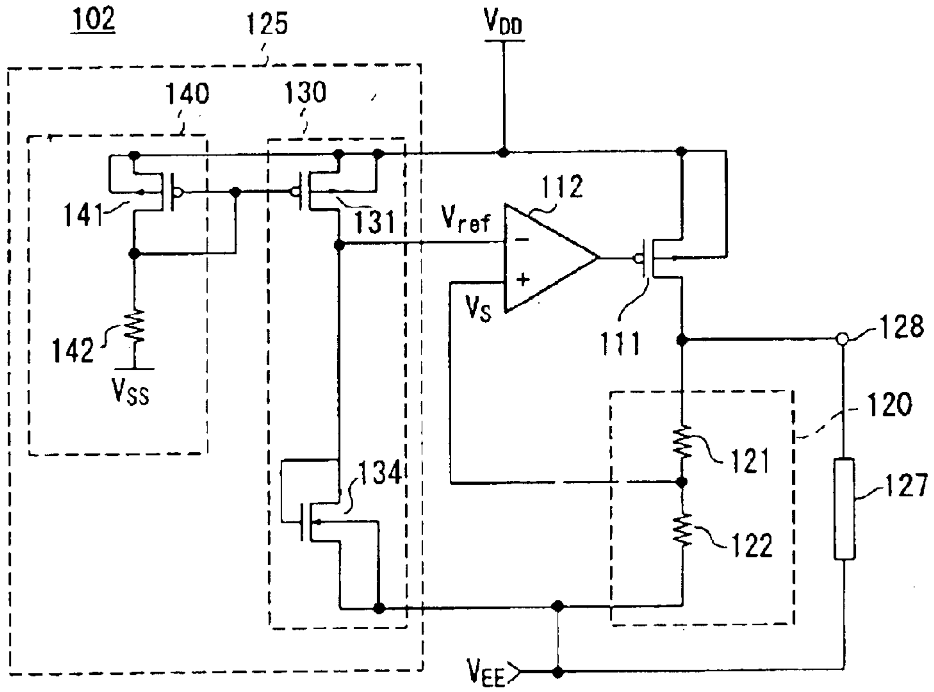
FIG. 3 shows a power supply circuit of the prior art.

Symbol 3 in FIG. 2 indicates an example of such a power supply circuit.

The power supply circuit 3 has output circuit 15, clamping circuit 20, and current source control circuit 50.

Current source control circuit 50 has detector transistor 54 configured with an n-channel transistor, inversion transistor 53, driver transistor 52 configured with a p-channel transistor, and load resistor 51 configured with a resistor element.

One end of load resistor 51 is connected to positive voltage line $V_{DD}$, and the other end is connected to the drain terminal of detector transistor 54. The source terminal of detector transistor 54 is connected to negative voltage line $V_{EE}$.

Clamping circuit 20 has the same circuit as that of clamping circuit 20 in FIG. 1 wherein the anode terminal side is connected to external output terminal 28, and the cathode side is connected to negative voltage line $V_{EE}$. In addition, the gate terminal of detector transistor 54 in FIG. 2 connected to the gate terminal and the drain terminal (anode terminal) of the third diode circuit 23, in which the source terminal is connected directly to negative voltage line $V_{EE}$, in clamping circuit 20.

Therefore, detector transistor 54 becomes conductive as clamping circuit 20 becomes conductive, and the drain terminal is short-circuited with negative voltage line $V_{EE}$.

On the other hand, when clamping circuit 20 shuts off, detector transistor 54 shuts off. At this time, the voltage of positive voltage line $V_{DD}$ is supplied to the drain terminal of detector transistor 54 by load resistor 51.

The gate terminal of inversion transistor 53 is connected to the drain terminal of detector transistor 54, and its source terminal is connected to negative voltage line $V_{EE}$. Therefore, inversion transistor 53 shuts off as detector transistor 54 becomes conductive and becomes conductive as it shuts off.

The drain terminal of driver transistor 52 is connected to the drain terminal of inversion transistor 53. The gate terminal of said driver transistor 52 is short-circuited with the drain terminal, and its source terminal is connected to positive voltage line $V_{DD}$.

Therefore, a current flows into driver transistor 52 as inversion transistor 53 becomes conductive, and the current stops flowing as it shuts off.

Output circuit 15 has first current supplying element 16 configured with a resistor element and the second current supplying element 12 configured with a p-channel type MOS transistor.

The source terminal of the second current supplying element 12 is connected to positive voltage line $V_{DD}$, and its gate terminal is connected to the gate terminal and the drain terminal of driver transistor 52.

Therefore, the second current supplying element 12 becomes conductive as driver transistor 52 becomes conductive and shuts off as it shuts off.

The drain terminal of the second current supplying element 12 is connected to external output terminal 28, whereby a current flows into negative load 27 and clamping circuit 20 connected to said external output terminal 28 as the second current supplying element 12 becomes conductive.

In addition, one end of the first current supplying element 16 is connected to positive voltage line $V_{DD}$, and the other end is connected to external output terminal 28. Therefore, the first current supplying element 16 and the second current supplying element 12 are connected in parallel with each other.

Here, assuming that a small current is flowing in load 27, and clamping circuit 20 is conductive, detection transistor 54 becomes conductive, and inversion transistor 53 shuts off. Under this condition, because no current flows in driver transistor 52, the second current supplying element is off. Therefore, the current flowing in the first current supplying element 16 is supplied to clamping circuit 20 and load 27.

When the current flowing in load 27 increases from said condition, the voltage of external output terminal 28 drops, and clamping circuit 20 shuts off, detection transistor 54 shuts off, inversion transistor 53 becomes conductive, and a current flows into driver transistor 52, so that the second current supplying element 12 becomes conductive. Once a current is supplied to load 27 by the second current supplying element 12, the voltage of external output terminal 28 increases.

Once a current flows into clamping circuit 20 as the voltage increases, the current flowing in the second current supplying element 12 decreases due to a feedback loop comprising detector transistor 54, inversion transistor 53, and driver transistor 52.

Furthermore, although the current supplying capability of the second current supplying element 12 is set lower than the current supplying capability of the first current supplying element 11 in the cases of power supply circuits 2 and 3, obviously the opposite setting may also be used.

In addition, although clamping circuit 20 was configured using a serial connection circuit comprising one first diode circuit 21 utilizing a p-channel MOS transistor and the second and third diode circuits 22 and 23 utilizing n-channel MOS transistors in the embodiments, clamping circuit 20 of the present invention requires only one diode circuit 23 which can be used to configure a current mirror together with at least detector transistor 34 or 54. In order to clamp the voltage of external output terminal 28 using desired clamping voltage $V_C$, another diode may also be connected directly to said diode circuit. Although the clamping voltage by clamping circuit 20 was set approximately at 4V in the embodiments, said value may be set arbitrarily.

The power supply circuit of the present invention requires no amplifier, only a small number of elements are required, and the power consumption is low.

What is claimed is:

1. A power supply circuit, comprising:

a current supply circuit having a first current supplying element connected in parallel to a current supply terminal and a second current supplying element including a transistor, a detection circuit including a clamping circuit provided with a plurality of diode circuits and connected in series with the current supply circuit in order to output a detection signal according to the voltage at the current supply terminal, and a control circuit having the second current supplying element, a first transistor constituting a current mirror, a second transistor which becomes conductive or non-conductive according to the detection signal, and a third transistor connected in series with the first transistor in order to control the conduction status of the first transistor according to the conduction status of the second transistor in order to clamp the power supply circuit.

2. The power supply circuit in claim 1, wherein the power supply circuit includes a bias circuit which outputs a bias voltage, the bias voltage being applied to the control terminal of the transistor.

3. The power supply circuit in claim 2, wherein the bias circuit includes a fourth transistor including a current mirror together with the first current supply circuit, and the control circuit has a fifth transistor includes a current mirror circuit together to supply a current to the second transistor.

* * * * *